United States Patent
Kale

(10) Patent No.: US 12,135,671 B2
(45) Date of Patent: Nov. 5, 2024

(54) VIDEO COMPRESSION IN REMOVABLE STORAGE DEVICE HAVING DEEP LEARNING ACCELERATOR AND RANDOM ACCESS MEMORY

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 103 days.

(21) Appl. No.: 16/906,261

(22) Filed: Jun. 19, 2020

(65) Prior Publication Data

US 2021/0400286 A1 Dec. 23, 2021

(51) Int. Cl.
*G06F 13/42* (2006.01)
*G06F 9/30* (2018.01)
(Continued)

(52) U.S. Cl.
CPC ...... *G06F 13/4282* (2013.01); *G06F 9/30043* (2013.01); *G06F 9/3877* (2013.01); *G06F 13/382* (2013.01); *G06N 3/08* (2013.01); *G06V 10/955* (2022.01); *H04N 19/43* (2014.11); *H04N 19/70* (2014.11); *G06F 2213/0026* (2013.01); *G06F 2213/0042* (2013.01)

(58) Field of Classification Search
CPC ........ H04N 19/43; H04N 19/70; H04N 19/42; G06F 9/30043; G06F 9/3877; G06F 13/382; G06F 13/4282; G06F 2213/0026; G06F 2213/0042; G06N 3/08; G06N 3/063; G06V 10/751; G06V 10/955
See application file for complete search history.

(56) References Cited

U.S. PATENT DOCUMENTS 11,037,330 B2 * 6/2021 Bar-On .................. G06T 9/002
11,115,673 B2 9/2021 Yang
(Continued)

FOREIGN PATENT DOCUMENTS

GB 2603987 A * 8/2022 ........... G06K 9/6228
WO WO-2020112228 A1 * 6/2020 ......... G06F 16/2246

OTHER PUBLICATIONS

International Search Report and Written Opinion, PCT/US2021/037452, mailed on Sep. 24, 2021.
(Continued)

*Primary Examiner* — Dramos Kalapodas
(74) *Attorney, Agent, or Firm* — Greenberg Traurig

(57) ABSTRACT

Systems, devices, and methods related to a Deep Learning Accelerator and memory are described. For example, a data storage device may be configured to execute instructions with matrix operands and configured with: an interface to receive a video stream; and random access memory to buffer a portion of the video stream as an input to an Artificial Neural Network and to store instructions executable by the Deep Learning Accelerator and matrices of the Artificial Neural Network. The Deep Learning Accelerator can execute the instructions to generate an output of the Artificial Neural Network, including analytics of the buffer portion. A video encoder in the data storage device may use the analytics to compress the portion of the video stream for storing in the device.

16 Claims, 9 Drawing Sheets

(51) Int. Cl.
    *G06F 9/38*     (2018.01)
    *G06F 13/38*     (2006.01)
    *G06N 3/08*     (2023.01)
    *G06V 10/94*     (2022.01)
    *H04N 19/43*     (2014.01)
    *H04N 19/70*     (2014.01)

(56) References Cited

U.S. PATENT DOCUMENTS

| | | | |
|---|---|---|---|
| 11,356,601 | B2 | 6/2022 | Kale |
| 11,490,135 | B2 | 11/2022 | Kale et al. |
| 2002/0136450 | A1* | 9/2002 | Chen .................. H04N 1/624 382/165 |
| 2008/0221734 | A1* | 9/2008 | Nagao ................. G06V 10/56 706/20 |
| 2011/0050896 | A1 | 3/2011 | Cobb et al. |
| 2011/0167024 | A1* | 7/2011 | Maldonado Diaz ... G06N 3/086 706/15 |
| 2015/0067009 | A1 | 3/2015 | Strauss et al. |
| 2017/0256165 | A1 | 9/2017 | Pennington et al. |
| 2017/0316312 | A1 | 11/2017 | Goyal et al. |
| 2019/0042483 | A1 | 2/2019 | Abramson et al. |
| 2019/0132591 | A1* | 5/2019 | Zhang ................. G06N 3/10 |
| 2019/0251397 | A1 | 8/2019 | Tremblay et al. |
| 2019/0265701 | A1 | 8/2019 | Troia et al. |
| 2019/0279051 | A1 | 9/2019 | Martinello et al. |
| 2019/0279082 | A1 | 9/2019 | Moloney et al. |
| 2019/0325303 | A1* | 10/2019 | Daga .................. G06N 3/0495 |
| 2020/0013265 | A1 | 1/2020 | Moloney |
| 2020/0021865 | A1 | 1/2020 | Topiwala et al. |
| 2020/0082852 | A1 | 3/2020 | Golov |
| 2020/0160034 | A1 | 5/2020 | Choi et al. |
| 2020/0311181 | A1* | 10/2020 | Azizi .................. G06F 9/30036 |
| 2020/0380369 | A1* | 12/2020 | Case .................. G06N 3/086 |
| 2021/0227126 | A1* | 7/2021 | Se ...................... H04N 23/61 |
| 2021/0366161 | A1* | 11/2021 | Wong ................. G06N 3/045 |
| 2021/0400187 | A1 | 12/2021 | Kale |
| 2021/0400315 | A1 | 12/2021 | Kale et al. |
| 2022/0083807 | A1* | 3/2022 | Zhang ................ G06N 3/084 |
| 2022/0256077 | A1 | 8/2022 | Kale |
| 2023/0007317 | A1 | 1/2023 | Kale et al. |

OTHER PUBLICATIONS

International Search Report and Written Opinion, PCT/US2021/036807, mailed on Sep. 28, 2021.
International Search Report and Written Opinion, PCT/US2021/037628, mailed on Oct. 8, 2021.

* cited by examiner

VIDEO COMPRESSION IN REMOVABLE STORAGE DEVICE HAVING DEEP LEARNING ACCELERATOR AND RANDOM ACCESS MEMORY

FIELD OF THE TECHNOLOGY

At least some embodiments disclosed herein relate to data storage devices in general and more particularly, but not limited to, removable devices powered by integrated accelerators for Artificial Neural Networks (ANNs), such as ANNs configured through machine learning and/or deep learning, for video compression and storage.

BACKGROUND

An Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

For example, the inputs to an ANN network may be generated based on camera inputs; and the outputs from the ANN network may be the identification of an item, such as an event or an object.

In general, an ANN may be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
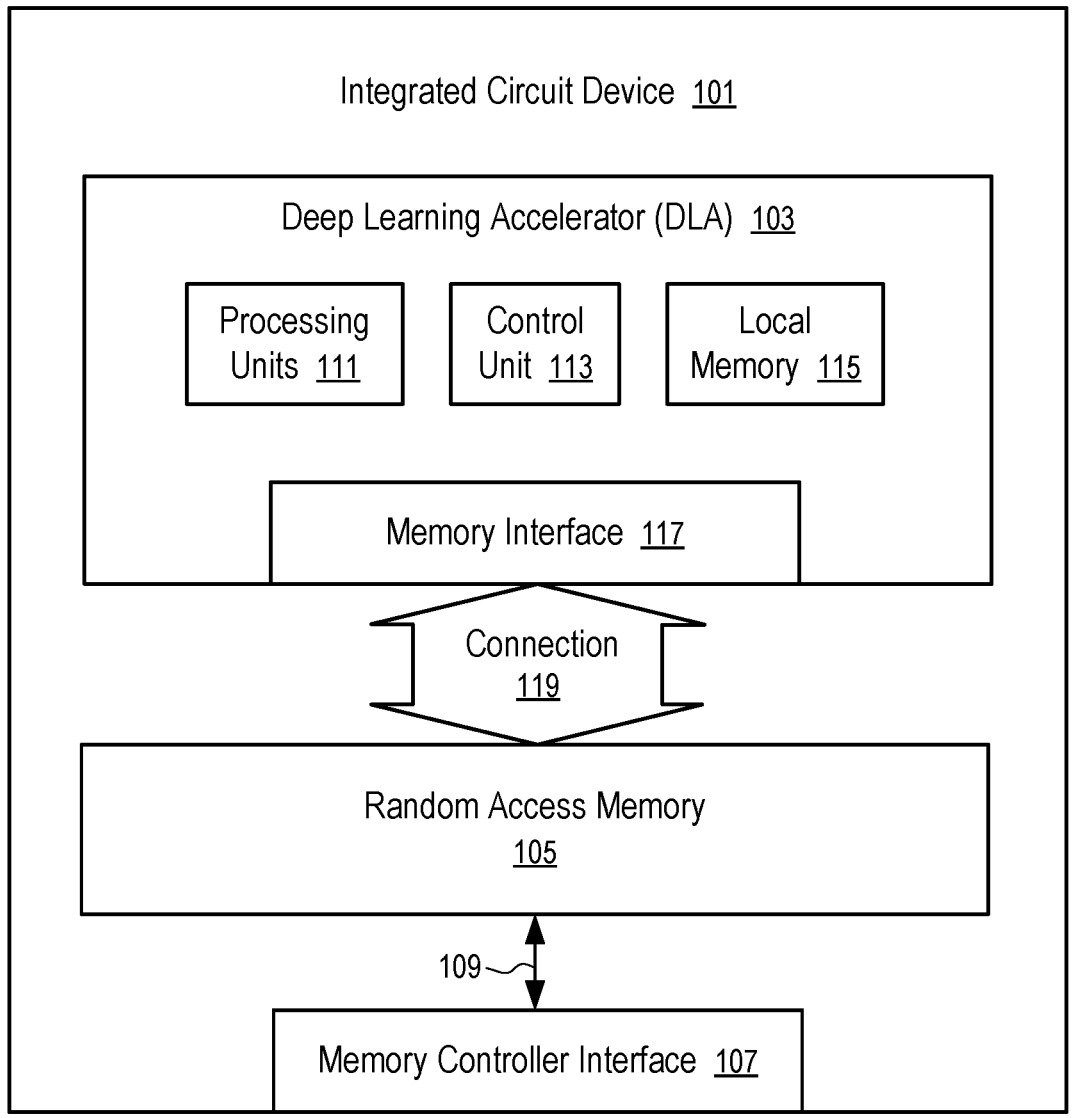
FIG. 1 shows an integrated circuit device having a Deep Learning Accelerator and random access memory configured according to one embodiment.

At least some embodiments disclosed herein provide a removable data storage device that has a general-purpose integrated circuit configured to perform computations of Artificial Neural Networks (ANNs) with reduced energy consumption and computation time. The integrated circuit includes a Deep Learning Accelerator (DLA) and random access memory. Input video data stored into the device is analyzed by an Artificial Neural Network to generate analytics based on which video compression is performed by a video encoder. The compressed video having a size smaller than the input video data can be stored in the data storage device as a replacement of the input video data and can be retrieved to playback the video for a presentation that is substantially the same was the playback of the input video data.

The Deep Learning Accelerator (DLA) includes a set of general-purpose, programmable hardware computing logic that is specialized and/or optimized to perform parallel vector and/or matrix calculations, including but not limited to multiplication and accumulation of vectors and/or matrices.

Further, the Deep Learning Accelerator (DLA) can include one or more Arithmetic-Logic Units (ALUs) to perform arithmetic and bitwise operations on integer binary numbers.

The Deep Learning Accelerator (DLA) is programmable via a set of instructions to perform the computations of an Artificial Neural Network (ANN).

The granularity of the Deep Learning Accelerator (DLA) operating on vectors and matrices corresponds to the largest unit of vectors/matrices that can be operated upon during the execution of one instruction by the Deep Learning Accelerator (DLA). During the execution of the instruction for a predefined operation on vector/matrix operands, elements of vector/matrix operands can be operated upon by the Deep Learning Accelerator (DLA) in parallel to reduce execution time and/or energy consumption associated with memory/ data access. The operations on vector/matrix operands of the granularity of the Deep Learning Accelerator (DLA) can be used as building blocks to implement computations on vectors/matrices of larger sizes.

The implementation of a typical/practical Artificial Neural Network (ANN) involves vector/matrix operands having sizes that are larger than the operation granularity of the Deep Learning Accelerator (DLA). To implement such an Artificial Neural Network (ANN) using the Deep Learning Accelerator (DLA), computations involving the vector/matrix operands of large sizes can be broken down to the computations of vector/matrix operands of the granularity of the Deep Learning Accelerator (DLA). The Deep Learning Accelerator (DLA) can be programmed via instructions to carry out the computations involving large vector/matrix operands. For example, atomic computation capabilities of the Deep Learning Accelerator (DLA) in manipulating vectors and matrices of the granularity of the Deep Learning Accelerator (DLA) in response to instructions can be programmed to implement computations in an Artificial Neural Network (ANN).

In some implementations, the Deep Learning Accelerator (DLA) lacks some of the logic operation capabilities of a typical Central Processing Unit (CPU). However, the Deep Learning Accelerator (DLA) can be configured with sufficient logic units to process the input data provided to an Artificial Neural Network (ANN) and generate the output of the Artificial Neural Network (ANN) according to a set of instructions generated for the Deep Learning Accelerator (DLA). Thus, the Deep Learning Accelerator (DLA) can perform the computation of an Artificial Neural Network (ANN) with little or no help from a Central Processing Unit (CPU) or another processor. Optionally, a conventional general purpose processor can also be configured as part of the Deep Learning Accelerator (DLA) to perform operations that cannot be implemented efficiently using the vector/matrix processing units of the Deep Learning Accelerator (DLA), and/or that cannot be performed by the vector/matrix processing units of the Deep Learning Accelerator (DLA).

A typical Artificial Neural Network (ANN) can be described/specified in a standard format (e.g., Open Neural Network Exchange (ONNX)). A compiler can be used to convert the description of the Artificial Neural Network (ANN) into a set of instructions for the Deep Learning Accelerator (DLA) to perform calculations of the Artificial Neural Network (ANN). The compiler can optimize the set of instructions to improve the performance of the Deep Learning Accelerator (DLA) in implementing the Artificial Neural Network (ANN).

The Deep Learning Accelerator (DLA) can have local memory, such as registers, buffers and/or caches, configured to store vector/matrix operands and the results of vector/matrix operations. Intermediate results in the registers can be pipelined/shifted in the Deep Learning Accelerator (DLA) as operands for subsequent vector/matrix operations to reduce time and energy consumption in accessing memory/data and thus speed up typical patterns of vector/matrix operations in implementing a typical Artificial Neural Network (ANN). The capacity of registers, buffers and/or caches in the Deep Learning Accelerator (DLA) is typically insufficient to hold the entire data set for implementing the computation of a typical Artificial Neural Network (ANN). Thus, a random access memory coupled to the Deep Learning Accelerator (DLA) is configured to provide an improved data storage capability for implementing a typical Artificial Neural Network (ANN). For example, the Deep Learning Accelerator (DLA) loads data and instructions from the random access memory and stores results back into the random access memory.

The communication bandwidth between the Deep Learning Accelerator (DLA) and the random access memory is configured to optimize or maximize the utilization of the computation power of the Deep Learning Accelerator (DLA). For example, high communication bandwidth can be provided between the Deep Learning Accelerator (DLA) and the random access memory such that vector/matrix operands can be loaded from the random access memory into the Deep Learning Accelerator (DLA) and results stored back into the random access memory in a time period that is approximately equal to the time for the Deep Learning Accelerator (DLA) to perform the computations on the vector/matrix operands. The granularity of the Deep Learning Accelerator (DLA) can be configured to increase the ratio between the amount of computations performed by the Deep Learning Accelerator (DLA) and the size of the vector/matrix operands such that the data access traffic between the Deep Learning Accelerator (DLA) and the random access memory can be reduced, which can reduce the requirement on the communication bandwidth between the Deep Learning Accelerator (DLA) and the random access memory. Thus, the bottleneck in data/memory access can be reduced or eliminated.

Some video coding techniques are based on the analysis of a video using a deep learning technique. Deep learning-based video coding techniques can include coding schemes that are built primarily on Deep Neural Networks (DNNs) and/or coding tools that use Deep Neural Networks (DNNs) to generate models, predictions, parameters, and/or options for use in traditional coding schemes and/or with traditional coding tools.

For example, a pixel probability model can be computed/estimated using a Deep Neural Network (DNN) to drive a deep learning-based coding scheme. For example, a Deep Neural Network (DNN) can be used to perform or facilitate intra-picture prediction, inter-picture prediction, cross-channel prediction, probability distribution prediction, transform, post-loop filtering, in-loop filtering, down-sampling, up-sampling, encoding optimization, etc. The predictions/optimization can be used with traditional coding schemes and/or traditional coding tools.

At least one embodiment disclosed herein includes a data storage device that is configured with a Deep Learning Accelerator (DLA) and random access memory to facilitate deep learning-based video coding. The data storage device can be configured as a removable storage media of a host computer system. The computation of the deep learning-based video coding can be performed within the removable storage device. Thus, the removable storage device can convert/compress an input video autonomously without help from the host system to which the removable storage device may be attached.

For example, after the removable storage device receives a high-resolution video, the Deep Learning Accelerator (DLA) of the removable storage device performs an analysis of the video to generate video analytics with high accuracy. The video analytics can include pixel probability model, intra-picture prediction, inter-picture prediction, cross-channel prediction, probability distribution prediction, etc. Alternatively, or in combination, the video analytics can identify transform, post-loop filtering, in-loop filtering, down-sampling, up-sampling, encoding optimization, etc. The high-resolution video can be compressed through coding based on the video analytics to generate a compressed video as a replacement of the high-resolution video for storing the video in the device. Optionally, a set of configuration settings can be communicated from the host system to the removable storage device to control aspects of the creation and storage of the compressed video. Such configuration settings can include input resolution, storage resolution, storage location, etc.

For example, the removable storage device can be configured as a solid state drive that can be connected to a host computer system via a port, such as a port to accept a Universal Serial Bus (USB) device.

For example, the removable storage device can be configured as a memory card that can be plugged into a slot of a reader of memory cards of a host computer system. The memory card can be configured with a form factor and interface of Secure Digital (SD) cards, MicroSD cards, CompactFlash (CF) cards, Memory Stick cards, etc.

For example, the removable storage device can be configured as a network storage device that can be attached to a host computer system via a wired or wireless computer network connection.

For example, the removable storage device can be a plug and play device that can be plugged into a port or a slot of a running computer system and be recognized and configured by the running computer system on the fly for normal operations as a storage device without requiring the computer system to restart or reboot.

For example, the removable storage device can be dynamically added to a running computer system via a wired or wireless computer connection without requiring the computer system to restart or reboot.

In some simplified implementations, the storage device may not be removable and/or may not be hot plugged into a running computer system in order to be configured for normal operations; and after the storage device is connected into the computer system (e.g., using a peripheral bus of the computer system, or a memory bus of the computer system), it may be necessary to restart the computer system to configure the storage device for normal operations in the computer system. In some implementations, the computer system is to be powered down in order to connect the storage device to the computer system.

For example, the storage device can include a host interface for a wired or a wireless connection to a host computer system using a wireless personal area network, a wireless local area network, a wired local area network, a Universal Serial Bus (USB), etc. The host computer system can be a personal computer, a mobile computer, a digital camera, a smartphone, a personal media player, a set top box, a hub of Internet of Things (IoTs), and/or a server computer.

After the storage device is connected to the host computer system, the host computer system can send commands to the storage device to store data into the storage device, such as a video file. In some instances, the video can be streamed to the storage device in an uncompressed format, or a compressed format. The Deep Learning Accelerator in the storage device analyzes the video file/stream to generate video analytics, such as pixel probability model, intra-picture prediction, inter-picture prediction, cross-channel prediction, probability distribution prediction, transform, post-loop filtering, in-loop filtering, down-sampling, up-sampling, encoding optimization, etc. A video encoder of the storage device codes/encodes/compresses the video file based on the video analytics and generates a compressed video file that is stored in the storage device as a replacement of the video file/stream received from the host computer system.

Optionally, the storage device can perform real-time, on the fly compression when the host computer system streams the video to the storage device. While a subsequent portion of a video is being streamed into the storage device, the storage device provides a previously buffered portion of the video as input to an Artificial Neural Network; and the Deep Learning Accelerator of the storage device performs the computation of the Artificial Neural Network to generate video analytics for the buffered portion; and the video encoder uses the video analytics to code/encode/compress of the buffered portion of the video stream on the fly while the streaming is in progress.

The random access memory in the storage device can include a portion configured to store input to the Artificial Neural Network (ANN) and another portion configured to store output from the Artificial Neural Network (ANN). The input video data received from the host computer system can be stored in a cyclic way in the input portion of the random access memory. Thus, the input video data for the latest period of the buffering a video stream in the storage device can be found in the input portion of the random access memory for analysis by the Deep Learning Accelerator according to the Artificial Neural Network (ANN) and for encoding by the video encoder. The Deep Learning Accelerator (DLA) can convert in real time, the input video audio data in the input portion into video analytics stored in the output portion of the random access memory; and the video encoder uses the video analytics stored in the output portion of the random access memory to compress the input video data stored in the input portion of the random access memory. The compressed video can be stored in the random access memory or another storage media according to a set of configuration parameters.

For example, a stream of input video data to the Artificial Neural Network (ANN) can be analyzed by the Artificial Neural Network (ANN) into identify segments associated with different scenes depicted in the video stream. Each video segment can be configured to be compressed as a unit. The length of a video segment can be limited by a predetermined number of frames. Further, each video segment can be provided as a set of input to the Artificial Neural Network (ANN) during a time slot. While the Deep Learning Accelerator (DLA) is computing the video analytics from the current set of input, the next video segment can be stored into the random access memory as the next input to the Artificial Neural Network (ANN); and concurrently, the output generated for the previous video segment can be retrieved from the random access memory for the coding/encoding/compression of the previous video segment. The input region of the random access memory can accommodate the storage of multiple video segments at the same time; and after the previous video segment has been encoded and stored, a new video segment can be stored/streamed into the area where the previous video segment is stored.

Thus, the task of compressing a video stream using an Artificial Neural Network (ANN) can be performed locally on the data storage device to reduce data storage requirement and to reduce computation workload on the host computer system that provides the video stream.

Further, neuromorphic memory can be used to implement the computations of matrix/vector multiplication and summation to reduce power consumption of the Deep Learning Accelerator (DLA).

For example, neuromorphic memory can be implemented using a crossbar array of memristors that are configured to perform the Multiply-and-Accumulate (MAC) operations via analog circuitry. Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations. The current in the bitline can be compared with a threshold to determine whether a neuron represented by the bitline is activated under the current input. An array of memristors can be connected to the bitlines respectively and programmed to have thresholds corresponding to the activation level thresholds of the neurons. A current detector can be configured for each memristor connected to the output of a bitline to determine whether the level of electric current in the bitline corresponding to a level that exceeds the threshold of the memristor.

FIG. 1 shows an integrated circuit device (101) having a Deep Learning Accelerator (103) and random access memory (105) configured according to one embodiment.

The Deep Learning Accelerator (103) in FIG. 1 includes processing units (111), a control unit (113), and local memory (115). When vector and matrix operands are in the local memory (115), the control unit (113) can use the processing units (111) to perform vector and matrix operations in accordance with instructions. Further, the control unit (113) can load instructions and operands from the random access memory (105) through a memory interface (117) and a high speed/bandwidth connection (119).

The integrated circuit device (101) is configured to be enclosed within an integrated circuit package with pins or contacts for a memory controller interface (107).

The memory controller interface (107) is configured to support a standard memory access protocol such that the integrated circuit device (101) appears to a typical memory controller in a way same as a conventional random access memory device having no Deep Learning Accelerator (DLA) (103). For example, a memory controller external to the integrated circuit device (101) can access, using a standard memory access protocol through the memory controller interface (107), the random access memory (105) in the integrated circuit device (101).

The integrated circuit device (101) is configured with a high bandwidth connection (119) between the random access memory (105) and the Deep Learning Accelerator (DLA) (103) that are enclosed within the integrated circuit device (101). The bandwidth of the connection (119) is higher than the bandwidth of the connection (109) between the random access memory (105) and the memory controller interface (107).

In one embodiment, both the memory controller interface (107) and the memory interface (117) are configured to access the random access memory (105) via a same set of buses or wires. Thus, the bandwidth to access the random access memory (105) is shared between the memory interface (117) and the memory controller interface (107). Alternatively, the memory controller interface (107) and the memory interface (117) are configured to access the random access memory (105) via separate sets of buses or wires. Optionally, the random access memory (105) can include multiple sections that can be accessed concurrently via the connection (119). For example, when the memory interface (117) is accessing a section of the random access memory (105), the memory control interface (107) can concurrently access another section of the random access memory (105). For example, the different sections can be configured on different integrated circuit dies and/or different planes/banks of memory cells; and the different sections can be accessed in parallel to increase throughput in accessing the random access memory (105). For example, the memory controller interface (107) is configured to access one data unit of a predetermined size at a time; and the memory interface (117) is configured to access multiple data units, each of the same predetermined size, at a time.

In one embodiment, the random access memory (105) and the integrated circuit device (101) are configured on different integrated circuit dies configured within a same integrated circuit package. Further, the random access memory (105) can be configured on one or more integrated circuit dies that allows parallel access of multiple data elements concurrently.

In some implementations, the number of data elements of a vector or matrix that can be accessed in parallel over the connection (119) corresponds to the granularity of the Deep Learning Accelerator (DLA) operating on vectors or matrices. For example, when the processing units (111) can operate on a number of vector/matrix elements in parallel, the connection (119) is configured to load or store the same number, or multiples of the number, of elements via the connection (119) in parallel.

Optionally, the data access speed of the connection (119) can be configured based on the processing speed of the Deep Learning Accelerator (DLA) (103). For example, after an amount of data and instructions have been loaded into the local memory (115), the control unit (113) can execute an instruction to operate on the data using the processing units (111) to generate output. Within the time period of processing to generate the output, the access bandwidth of the connection (119) allows the same amount of data and instructions to be loaded into the local memory (115) for the next operation and the same amount of output to be stored back to the random access memory (105). For example, while the control unit (113) is using a portion of the local memory (115) to process data and generate output, the memory interface (117) can offload the output of a prior operation into the random access memory (105) from, and load operand data and instructions into, another portion of the local memory (115). Thus, the utilization and performance of the Deep Learning Accelerator (DLA) are not restricted or reduced by the bandwidth of the connection (119).

The random access memory (105) can be used to store the model data of an Artificial Neural Network (ANN) and to buffer input data for the Artificial Neural Network (ANN). The model data does not change frequently. The model data can include the output generated by a compiler for the Deep Learning Accelerator (DLA) to implement the Artificial Neural Network (ANN). The model data typically includes matrices used in the description of the Artificial Neural Network (ANN) and instructions generated for the Deep Learning Accelerator (DLA) (103) to perform vector/matrix operations of the Artificial Neural Network (ANN) based on vector/matrix operations of the granularity of the Deep Learning Accelerator (DLA) (103). The instructions operate not only on the vector/matrix operations of the Artificial Neural Network (ANN), but also on the input data for the Artificial Neural Network (ANN).

In one embodiment, when the input data is loaded or updated in the random access memory (105), the control unit (113) of the Deep Learning Accelerator (DLA) (103) can automatically execute the instructions for the Artificial Neural Network (ANN) to generate an output of the Artificial Neural Network (ANN). The output is stored into a predefined region in the random access memory (105). The Deep Learning Accelerator (DLA) (103) can execute the instructions without help from a Central Processing Unit (CPU). Thus, communications for the coordination between the Deep Learning Accelerator (DLA) (103) and a processor outside of the integrated circuit device (101) (e.g., a Central Processing Unit (CPU)) can be reduced or eliminated.

Optionally, the logic circuit of the Deep Learning Accelerator (DLA) (103) can be implemented via Complementary Metal Oxide Semiconductor (CMOS). For example, the technique of CMOS Under the Array (CUA) of memory cells of the random access memory (105) can be used to implement the logic circuit of the Deep Learning Accelerator (DLA) (103), including the processing units (111) and the control unit (113). Alternatively, the technique of CMOS in the Array of memory cells of the random access memory (105) can be used to implement the logic circuit of the Deep Learning Accelerator (DLA) (103).

In some implementations, the Deep Learning Accelerator (DLA) (103) and the random access memory (105) can be implemented on separate integrated circuit dies and connected using Through-Silicon Vias (TSV) for increased data bandwidth between the Deep Learning Accelerator (DLA) (103) and the random access memory (105). For example, the Deep Learning Accelerator (DLA) (103) can be formed on an integrated circuit die of a Field-Programmable Gate Array (FPGA) or Application Specific Integrated circuit (ASIC).

Alternatively, the Deep Learning Accelerator (DLA) (103) and the random access memory (105) can be configured in separate integrated circuit packages and connected via multiple point-to-point connections on a printed circuit board (PCB) for parallel communications and thus increased data transfer bandwidth.

The random access memory (105) can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer that is located above the memory element columns, and wires of the other layer run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory (105). The non-volatile memory in the random access memory (105) can be used to store the model data of an Artificial Neural Network (ANN). Thus, after the integrated circuit device (101) is powered off and restarts, it is not necessary to reload the model data of the Artificial Neural Network (ANN) into the integrated circuit device (101). Further, the non-volatile memory can be programmable/rewritable. Thus, the model data of the Artificial Neural Network (ANN) in the integrated circuit device (101) can be updated or replaced to implement an update Artificial Neural Network (ANN), or another Artificial Neural Network (ANN).

The processing units (111) of the Deep Learning Accelerator (DLA) (103) can include vector-vector units, matrix-vector units, and/or matrix-matrix units. Examples of units configured to perform for vector-vector operations, matrix-vector operations, and matrix-matrix operations are discussed below in connection with FIGS. 2-4.

Figure 2:
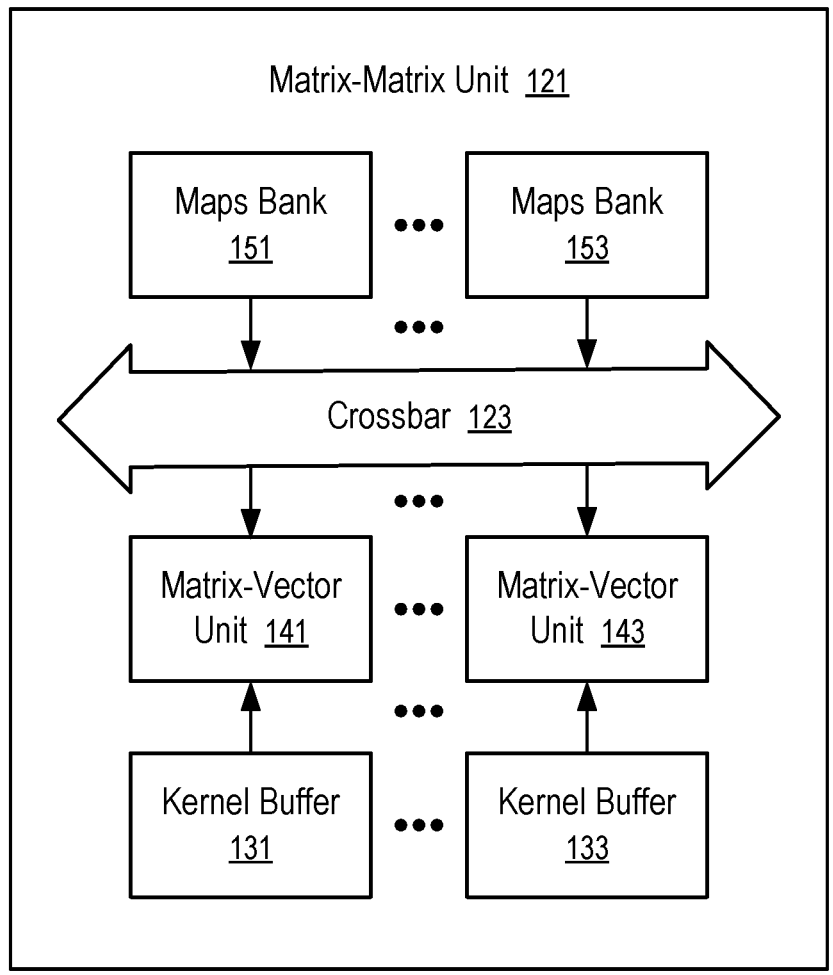
FIG. 2 shows a processing unit configured to perform matrix-matrix operations according to one embodiment.

FIG. 2 shows a processing unit (121) configured to perform matrix-matrix operations according to one embodiment. For example, the matrix-matrix unit (121) of FIG. 2 can be used as one of the processing units (111) of the Deep Learning Accelerator (DLA) (103) of FIG. 1.

In FIG. 2, the matrix-matrix unit (121) includes multiple kernel buffers (131 to 133) and multiple the maps banks (151 to 153). Each of the maps banks (151 to 153) stores one vector of a matrix operand that has multiple vectors stored in the maps banks (151 to 153) respectively; and each of the kernel buffers (131 to 133) stores one vector of another matrix operand that has multiple vectors stored in the kernel buffers (131 to 133) respectively. The matrix-matrix unit (121) is configured to perform multiplication and accumulation operations on the elements of the two matrix operands, using multiple matrix-vector units (141 to 143) that operate in parallel.

A cross bar (123) connects the maps banks (151 to 153) to the matrix-vector units (141 to 143). The same matrix operand stored in the maps bank (151 to 153) is provided via the crossbar (123) to each of the matrix-vector units (141 to 143); and the matrix-vector units (141 to 143) receives data elements from the maps banks (151 to 153) in parallel. Each of the kernel buffers (131 to 133) is connected to a respective one in the matrix-vector units (141 to 143) and provides a vector operand to the respective matrix-vector unit. The matrix-vector units (141 to 143) operate concurrently to compute the operation of the same matrix operand, stored in the maps banks (151 to 153) multiplied by the corresponding vectors stored in the kernel buffers (131 to 133). For example, the matrix-vector unit (141) performs the multiplication operation on the matrix operand stored in the maps banks (151 to 153) and the vector operand stored in the kernel buffer (131), while the matrix-vector unit (143) is concurrently performing the multiplication operation on the matrix operand stored in the maps banks (151 to 153) and the vector operand stored in the kernel buffer (133).

Figure 3:
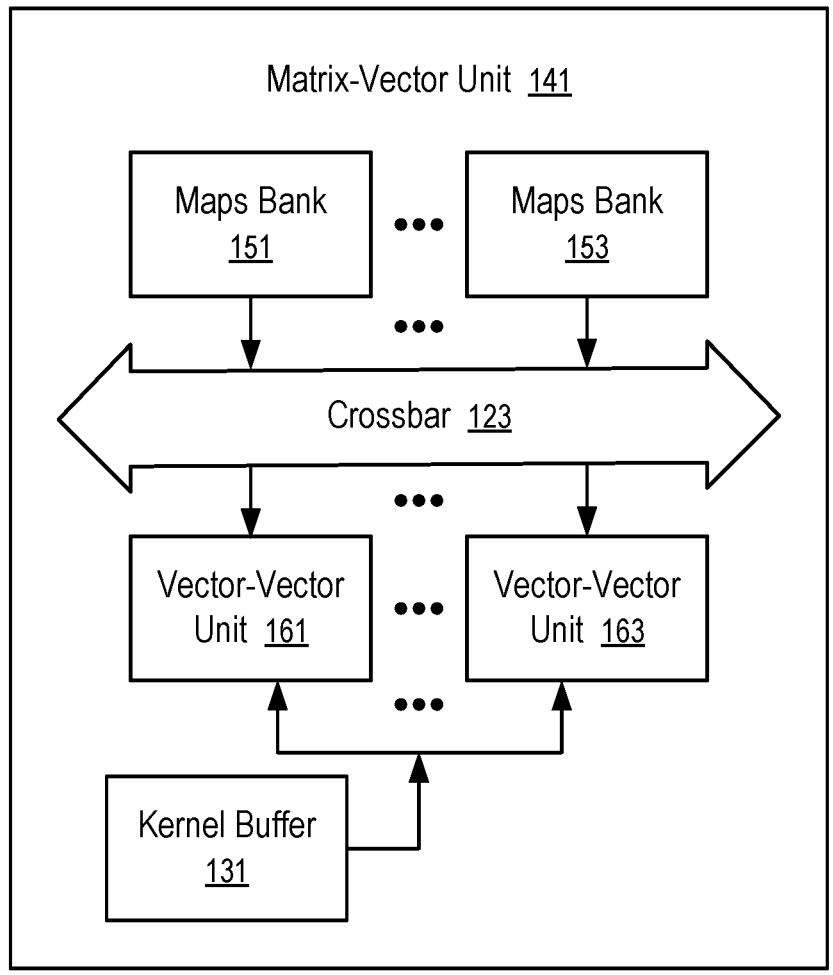
FIG. 3 shows a processing unit configured to perform matrix-vector operations according to one embodiment.

Each of the matrix-vector units (141 to 143) in FIG. 2 can be implemented in a way as illustrated in FIG. 3.

FIG. 3 shows a processing unit (141) configured to perform matrix-vector operations according to one embodiment. For example, the matrix-vector unit (141) of FIG. 3 can be used as any of the matrix-vector units in the matrix-matrix unit (121) of FIG. 2.

In FIG. 3, each of the maps banks (151 to 153) stores one vector of a matrix operand that has multiple vectors stored in the maps banks (151 to 153) respectively, in a way similar to the maps banks (151 to 153) of FIG. 2. The crossbar (123) in FIG. 3 provides the vectors from the maps banks (151) to the vector-vector units (161 to 163) respectively. A same vector stored in the kernel buffer (131) is provided to the vector-vector units (161 to 163).

The vector-vector units (161 to 163) operate concurrently to compute the operation of the corresponding vector operands, stored in the maps banks (151 to 153) respectively, multiplied by the same vector operand that is stored in the kernel buffer (131). For example, the vector-vector unit (161) performs the multiplication operation on the vector operand stored in the maps bank (151) and the vector operand stored in the kernel buffer (131), while the vector-vector unit (163) is concurrently performing the multiplication operation on the vector operand stored in the maps bank (153) and the vector operand stored in the kernel buffer (131).

When the matrix-vector unit (141) of FIG. 3 is implemented in a matrix-matrix unit (121) of FIG. 2, the matrix-vector unit (141) can use the maps banks (151 to 153), the crossbar (123) and the kernel buffer (131) of the matrix-matrix unit (121).

Figure 4:
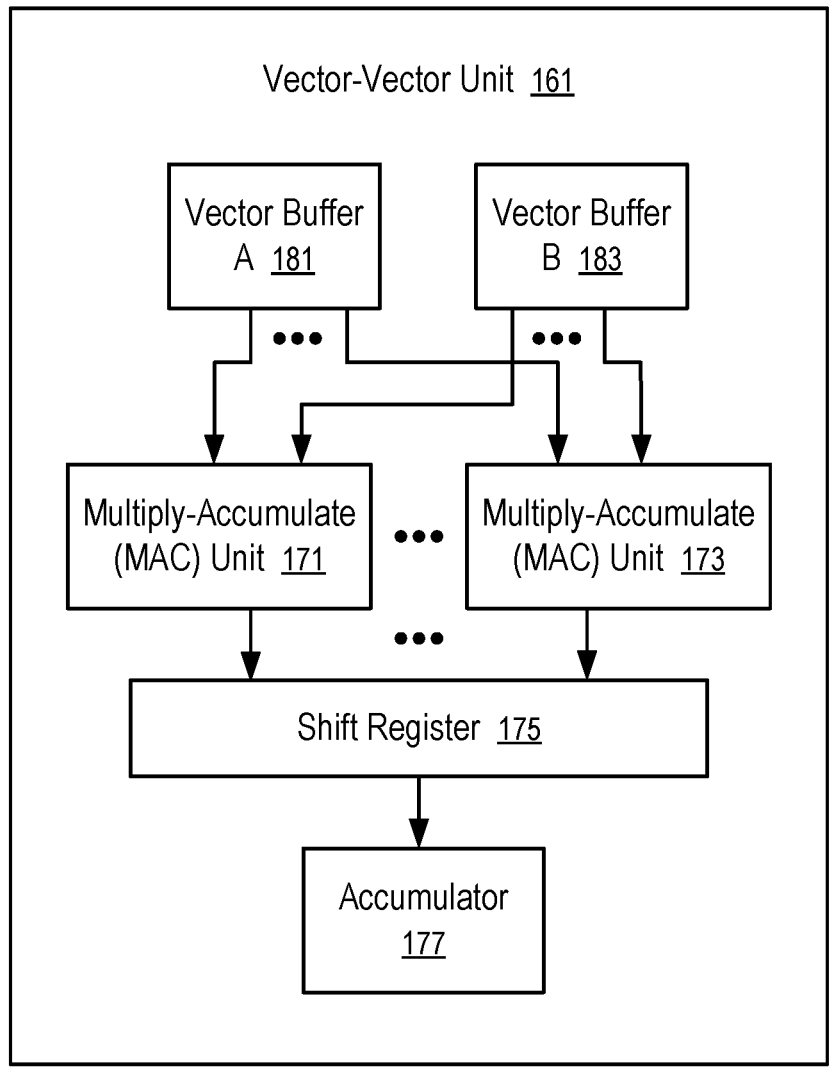
FIG. 4 shows a processing unit configured to perform vector-vector operations according to one embodiment.

Each of the vector-vector units (161 to 163) in FIG. 3 can be implemented in a way as illustrated in FIG. 4.

FIG. 4 shows a processing unit (161) configured to perform vector-vector operations according to one embodiment. For example, the vector-vector unit (161) of FIG. 4 can be used as any of the vector-vector units in the matrix-vector unit (141) of FIG. 3.

In FIG. 4, the vector-vector unit (161) has multiple multiply-accumulate (MAC) units (171 to 173). Each of the multiply-accumulate (MAC) units (171 to 173) can receive two numbers as operands, perform multiplication of the two numbers, and add the result of the multiplication to a sum maintained in the multiply-accumulate (MAC) unit.

Each of the vector buffers (181 and 183) stores a list of numbers. A pair of numbers, each from one of the vector buffers (181 and 183), can be provided to each of the multiply-accumulate (MAC) units (171 to 173) as input. The multiply-accumulate (MAC) units (171 to 173) can receive multiple pairs of numbers from the vector buffers (181 and 183) in parallel and perform the multiply-accumulate (MAC) operations in parallel. The outputs from the multiply-accumulate (MAC) units (171 to 173) are stored into the shift register (175); and an accumulator (177) computes the sum of the results in the shift register (175).

When the vector-vector unit (161) of FIG. 4 is implemented in a matrix-vector unit (141) of FIG. 3, the vector-vector unit (161) can use a maps bank (e.g., 151 or 153) as one vector buffer (181), and the kernel buffer (131) of the matrix-vector unit (141) as another vector buffer (183).

The vector buffers (181 and 183) can have a same length to store the same number/count of data elements. The length can be equal to, or the multiple of, the count of multiply-accumulate (MAC) units (171 to 173) in the vector-vector unit (161). When the length of the vector buffers (181 and 183) is the multiple of the count of multiply-accumulate (MAC) units (171 to 173), a number of pairs of inputs, equal to the count of the multiply-accumulate (MAC) units (171 to 173), can be provided from the vector buffers (181 and 183) as inputs to the multiply-accumulate (MAC) units (171 to 173) in each iteration; and the vector buffers (181 and 183) feed their elements into the multiply-accumulate (MAC) units (171 to 173) through multiple iterations.

In one embodiment, the communication bandwidth of the connection (119) between the Deep Learning Accelerator (DLA) (103) and the random access memory (105) is sufficient for the matrix-matrix unit (121) to use portions of the random access memory (105) as the maps banks (151 to 153) and the kernel buffers (131 to 133).

In another embodiment, the maps banks (151 to 153) and the kernel buffers (131 to 133) are implemented in a portion of the local memory (115) of the Deep Learning Accelerator (DLA) (103). The communication bandwidth of the connection (119) between the Deep Learning Accelerator (DLA) (103) and the random access memory (105) is sufficient to load, into another portion of the local memory (115), matrix operands of the next operation cycle of the matrix-matrix unit (121), while the matrix-matrix unit (121) is performing the computation in the current operation cycle using the maps banks (151 to 153) and the kernel buffers (131 to 133) implemented in a different portion of the local memory (115) of the Deep Learning Accelerator (DLA) (103).

Figure 5:
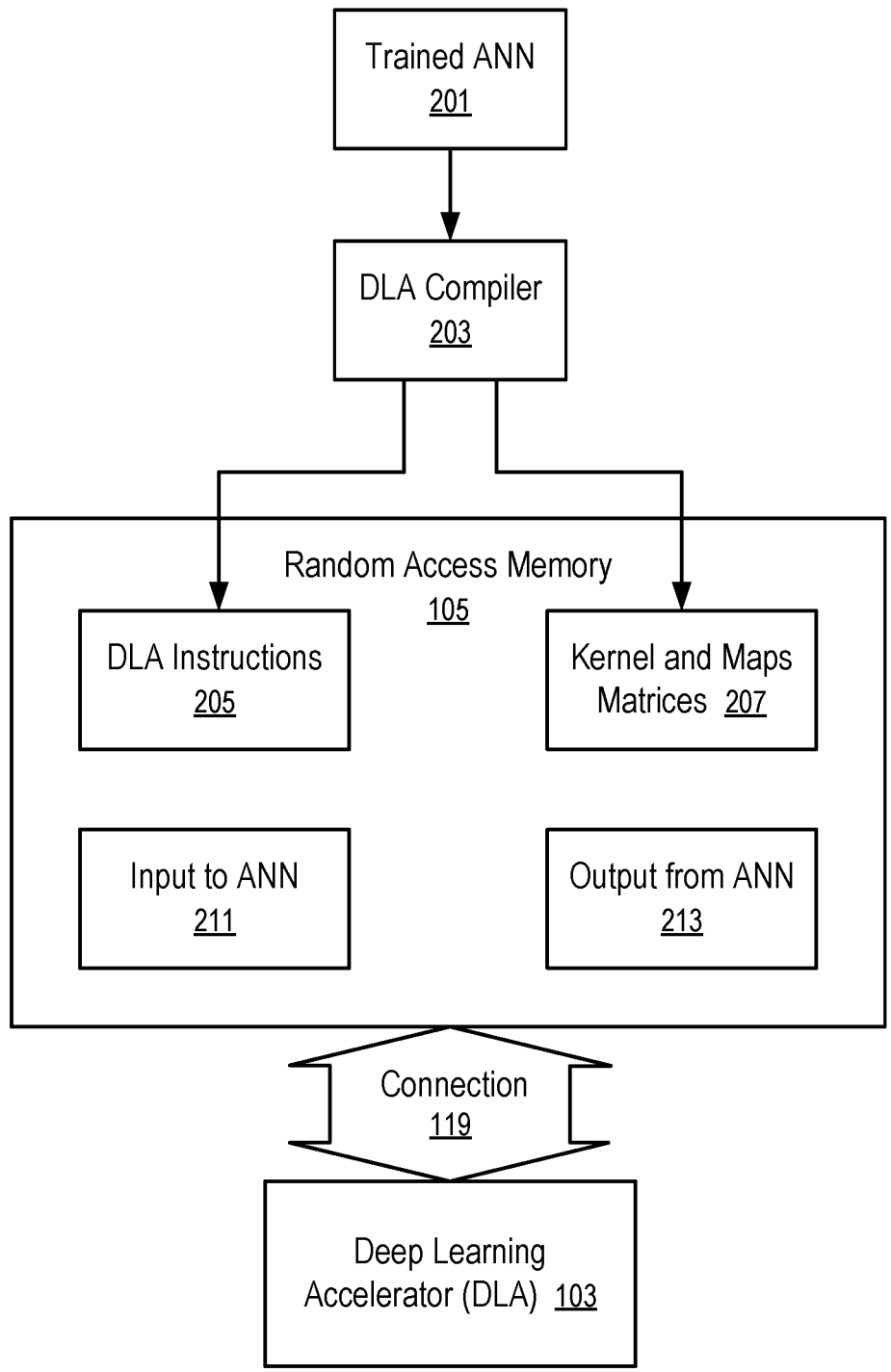
FIG. 5 shows a Deep Learning Accelerator and random access memory configured to autonomously apply inputs to a trained Artificial Neural Network according to one embodiment.

FIG. 5 shows a Deep Learning Accelerator and random access memory configured to autonomously apply inputs to a trained Artificial Neural Network according to one embodiment.

An Artificial Neural Network (ANN) (201) that has been trained through machine learning (e.g., deep learning) can be described in a standard format (e.g., Open Neural Network Exchange (ONNX)). The description of the trained ANN (201) in the standard format identifies the properties of the artificial neurons and their connectivity.

In FIG. 5, a Deep Learning Accelerator (DLA) compiler (203) converts trained ANN (201) by generating instructions (205) for a Deep Learning Accelerator (DLA) (103) and matrices (207) corresponding to the properties of the artificial neurons and their connectivity. The instructions (205) and the matrices (207) generated by the DLA compiler (203) from the trained ANN (201) can be stored in random access memory (105) for the Deep Learning Accelerator (DLA) (103).

For example, the random access memory (105) and the Deep Learning Accelerator (DLA) (103) can be connected via a high bandwidth connection (119) in a way as in the integrated circuit device (101) of FIG. 1. The autonomous computation of FIG. 5 based on the instructions (205) and the matrices (207) can be implemented in the integrated circuit device (101) of FIG. 1. Alternatively, the random access memory (105) and the Deep Learning Accelerator (DLA) (103) can be configured on a printed circuit board with multiple point to point serial buses running in parallel to implement the connection (119).

In FIG. 5, after the results of the DLA compiler (203) are stored in the random access memory (105), the application of the trained ANN (201) to process an input (211) to the trained ANN (201) to generate the corresponding output (213) of the trained ANN (213) can be triggered by the presence of the input (211) in the random access memory (105), or another indication provided in the random access memory (105).

In response, the Deep Learning Accelerator (DLA) (103) executes the instructions (205) to combine the input (211) and the matrices (207). The execution of the instructions (205) can include the generation of maps matrices for the maps banks (151 to 153) of one or more matrix-matrix units (e.g., 121) of the Deep Learning Accelerator (DLA) (103).

In some embodiments, the inputs to ANN (211) is in the form of an initial maps matrix. Portions of the initial maps matrix can be retrieved from the random access memory (105) as the matrix operand stored in the maps banks (151 to 153) of a matrix-matrix unit (121). Alternatively, the DLA instructions (205) also include instructions for the Deep Learning Accelerator (DLA) (103) to generate the initial maps matrix from the input (211).

According to the DLA instructions (205), the Deep Learning Accelerator (DLA) (103) loads matrix operands into the kernel buffers (131 to 133) and maps banks (151 to 153) of its matrix-matrix unit (121). The matrix-matrix unit (121) performs the matrix computation on the matrix operands. For example, the DLA instructions (205) break down matrix computations of the trained ANN (201) according to the computation granularity of the Deep Learning Accelerator (DLA) (103) (e.g., the sizes/dimensions of matrices that loaded as matrix operands in the matrix-matrix unit (121)) and applies the input feature maps to the kernel of a layer of artificial neurons to generate output as the input for the next layer of artificial neurons.

Upon completion of the computation of the trained ANN (201) performed according to the instructions (205), the Deep Learning Accelerator (DLA) (103) stores the output (213) of the ANN (201) at a pre-defined location in the random access memory (105), or at a location specified in an indication provided in the random access memory (105) to trigger the computation.

When the technique of FIG. 5 is implemented in the integrated circuit device (101) of FIG. 1, an external device connected to the memory controller interface (107) can write the input (211) into the random access memory (105) and trigger the autonomous computation of applying the input (211) to the trained ANN (201) by the Deep Learning Accelerator (DLA) (103). After a period of time, the output (213) is available in the random access memory (105); and the external device can read the output (213) via the memory controller interface (107) of the integrated circuit device (101).

For example, a predefined location in the random access memory (105) can be configured to store an indication to trigger the autonomous execution of the instructions (205) by the Deep Learning Accelerator (DLA) (103). The indication can optionally include a location of the input (211) within the random access memory (105). Thus, during the autonomous execution of the instructions (205) to process the input (211), the external device can retrieve the output generated during a previous run of the instructions (205), and/or store another set of input for the next run of the instructions (205).

Optionally, a further predefined location in the random access memory (105) can be configured to store an indication of the progress status of the current run of the instructions (205). Further, the indication can include a prediction of the completion time of the current run of the instructions (205) (e.g., estimated based on a prior run of the instructions (205)). Thus, the external device can check the completion status at a suitable time window to retrieve the output (213).

In some embodiments, the random access memory (105) is configured with sufficient capacity to store multiple sets of inputs (e.g., 211) and outputs (e.g., 213). Each set can be configured in a predetermined slot/area in the random access memory (105).

The Deep Learning Accelerator (DLA) (103) can execute the instructions (205) autonomously to generate the output (213) from the input (211) according to matrices (207) stored in the random access memory (105) without helps from a processor or device that is located outside of the integrated circuit device (101).

In a method according to one embodiment, random access memory (105) of a computing device (e.g., 101) can be accessed using an interface (107) of the computing device (e.g., 101) to a memory controller. The computing device (e.g., 101) can have processing units (e.g., 111) configured to perform at least computations on matrix operands, such as a matrix operand stored in maps banks (151 to 153) and a matrix operand stored in kernel buffers (131 to 133).

For example, the computing device (e.g., 101) can be enclosed within an integrated circuit package; and a set of connections can connect the interface (107) to the memory controller that is located outside of the integrated circuit package.

Instructions (205) executable by the processing units (e.g., 111) can be written into the random access memory (105) through the interface (107).

Matrices (207) of an Artificial Neural Network (201) can be written into the random access memory (105) through the interface (107). The matrices (207) identify the property and/or state of the Artificial Neural Network (201).

Optionally, at least a portion of the random access memory (105) is non-volatile and configured to store the instructions (205) and the matrices (207) of the Artificial Neural Network (201).

First input (211) to the Artificial Neural Network can be written into the random access memory (105) through the interface (107).

An indication is provided in the random access memory (105) to cause the processing units (111) to start execution of the instructions (205). In response to the indication, the processing units (111) execute the instructions to combine the first input (211) with the matrices (207) of the Artificial Neural Network (201) to generate first output (213) from the Artificial Neural Network (201) and store the first output (213) in the random access memory (105).

For example, the indication can be an address of the first input (211) in the random access memory (105); and the indication can be stored a predetermined location in the random access memory (105) to cause the initiation of the execution of the instructions (205) for the input (211) identified by the address. Optionally, the indication can also include an address for storing the output (213).

The first output (213) can be read, through the interface (107), from the random access memory (105).

For example, the computing device (e.g., 101) can have a Deep Learning Accelerator (103) formed on a first integrated circuit die and the random access memory (105) formed on one or more second integrated circuit dies. The connection (119) between the first integrated circuit die and the one or more second integrated circuit dies can include Through-Silicon Vias (TSVs) to provide high bandwidth for memory access.

For example, a description of the Artificial Neural Network (201) can be converted using a compiler (203) into the instructions (205) and the matrices (207). The combination of the instructions (205) and the matrices (207) stored in the random access memory (105) and the Deep Learning Accelerator (103) provides an autonomous implementation of the Artificial Neural Network (201) that can automatically convert input (211) to the Artificial Neural Network (201) to its output (213).

For example, during a time period in which the Deep Learning Accelerator (103) executes the instructions (205) to generate the first output (213) from the first input (211) according to the matrices (207) of the Artificial Neural Network (201), the second input to Artificial Neural Network (201) can be written into the random access memory (105) through the interface (107) at an alternative location. After the first output (213) is stored in the random access memory (105), an indication can be provided in the random access memory to cause the Deep Learning Accelerator (103) to again start the execution of the instructions and generate second output from the second input.

During the time period in which the Deep Learning Accelerator (103) executes the instructions (205) to generate the second output from the second input according to the matrices (207) of the Artificial Neural Network (201), the first output (213) can be read from the random access memory (105) through the interface (107); and a further input can be written into the random access memory to replace the first input (211), or written at a different location. The process can be repeated for a sequence of inputs.

The Deep Learning Accelerator (103) can include at least one matrix-matrix unit (121) that can execute an instruction on two matrix operands. The two matrix operands can be a first matrix and a second matrix. Each of two matrices has a plurality of vectors. The matrix-matrix unit (121) can include a plurality of matrix-vector units (141 to 143) configured to operate in parallel. Each of the matrix-vector units (141 to 143) are configured to operate, in parallel with other matrix-vector units, on the first matrix and one vector from second matrix. Further, each of the matrix-vector units (141 to 143) can have a plurality of vector-vector units (161 to 163) configured to operate in parallel. Each of the vector-vector units (161 to 163) is configured to operate, in parallel with other vector-vector units, on a vector from the first matrix and a common vector operand of the corresponding matrix-vector unit. Further, each of the vector-vector units (161 to 163) can have a plurality of multiply-accumulate units (171 to 173) configured to operate in parallel.

The Deep Learning Accelerator (103) can have local memory (115) and a control unit (113) in addition to the processing units (111). The control unit (113) can load instructions (205) and matrix operands (e.g., 207) from the random access memory (105) for execution by the processing units (111). The local memory can cache matrix operands used by the matrix-matrix unit. The connection (119) can be configured with a bandwidth sufficient to load a set of matrix operands from the random access memory (105) to the local memory (115) during a time period in which the matrix-matrix unit performs operations on two other matrix operands. Further, during the time period, the bandwidth is sufficient to store a result, generated by the matrix-matrix unit (121) in a prior instruction execution, from the local memory (115) to the random access memory (105).

The Deep Learning Accelerator (103) and the random access memory (105) can be configured in a data storage device to calculate video analytics for compressing video data. For example, the data storage device can be used to receive a video stream and generate a compressed video file storing the video stream using a deep learning-based video coding technique.

For example, a computer system can store a set of configuration parameters into the data storage device to control aspects of the compress of video files/streams provided to the data storage device. The configuration parameters can include identifications of attributes of the video files/streams to be compressed for storing in the data storage device, such as the format and resolution of the input video files/streams, the resolution of the compressed video file, the location in the data storage device to store the compressed video file, etc.

After the configuration parameters are stored in the data storage device, the data storage device can automatically convert a video file/stream received from the computer system into a compressed video file using a deep learning-based video coding technique.

For example, the Deep Learning Accelerator (103) executes the instructions (205) to perform the computation of the Artificial Neural Network (201) that receives the video file/stream as the input (211) and generating the video analytics as the output (213); and a video encoder uses the video analytics to compress the video file/stream and generate a compressed video file that is stored in the data storage device. Subsequently, the computer system may retrieve the compressed video file for playing back the video content, or request the data storage device to decompress the video file for streaming from the data storage device in another format for playback.

For example, the data storage device can have a transceiver or a host interface for a wired or wireless communication connection to a separate computer system such as a personal computer, a set top box, a hub of Internet of Things (IoT), a server computer, a smartphone, a personal medial player, a digital camera, a mobile computer, a tablet computer, etc. The computer system may store a video into the data storage device, which uses a deep learning-based video coding technique to compress it for storage in the device.

The video compression capability of the data storage device can be customized, updated, and/or upgraded via receiving, through the transceiver or host interface, and storing into the random access memory (105), the matrices (207) and instructions (205) of an Artificial Neural Network (201).

The Artificial Neural Network (201), implemented via the Deep Learning Accelerator (103) executing the instructions (205), provides analytics for the compression of the video received in the transceiver or host interface for storing in the data storage device. The compression improves the capability of the data storage device in storing video content, reduces the communication bandwidth to transmit the video content from the data storage device, and/or reduces the computation workloads of the computer system in which the data storage device is installed.

Figure 6:
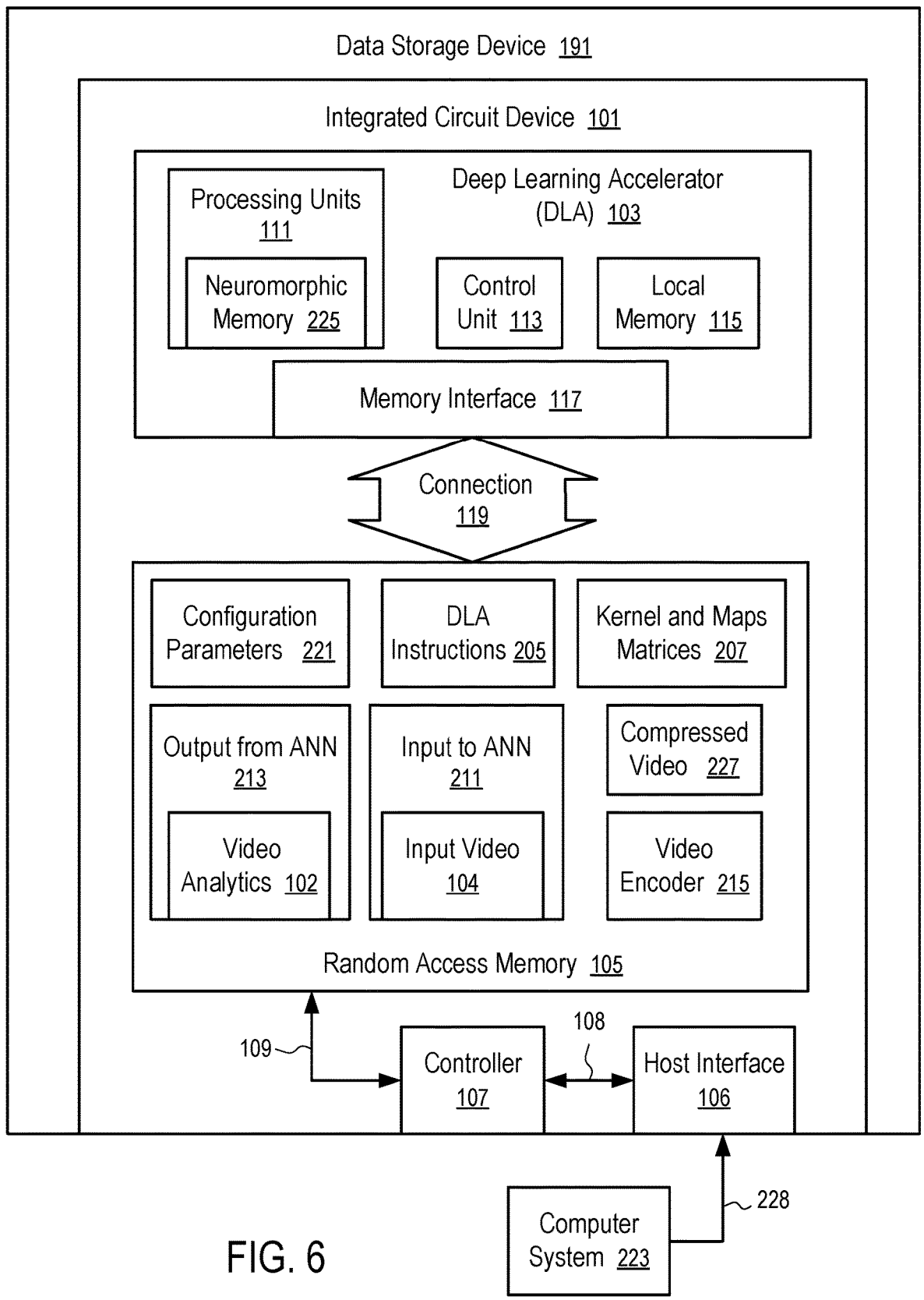
FIGS. 6-8 illustrate storage devices having a Deep Learning Accelerator and random access memory configured according to some embodiments.
Figure 7:
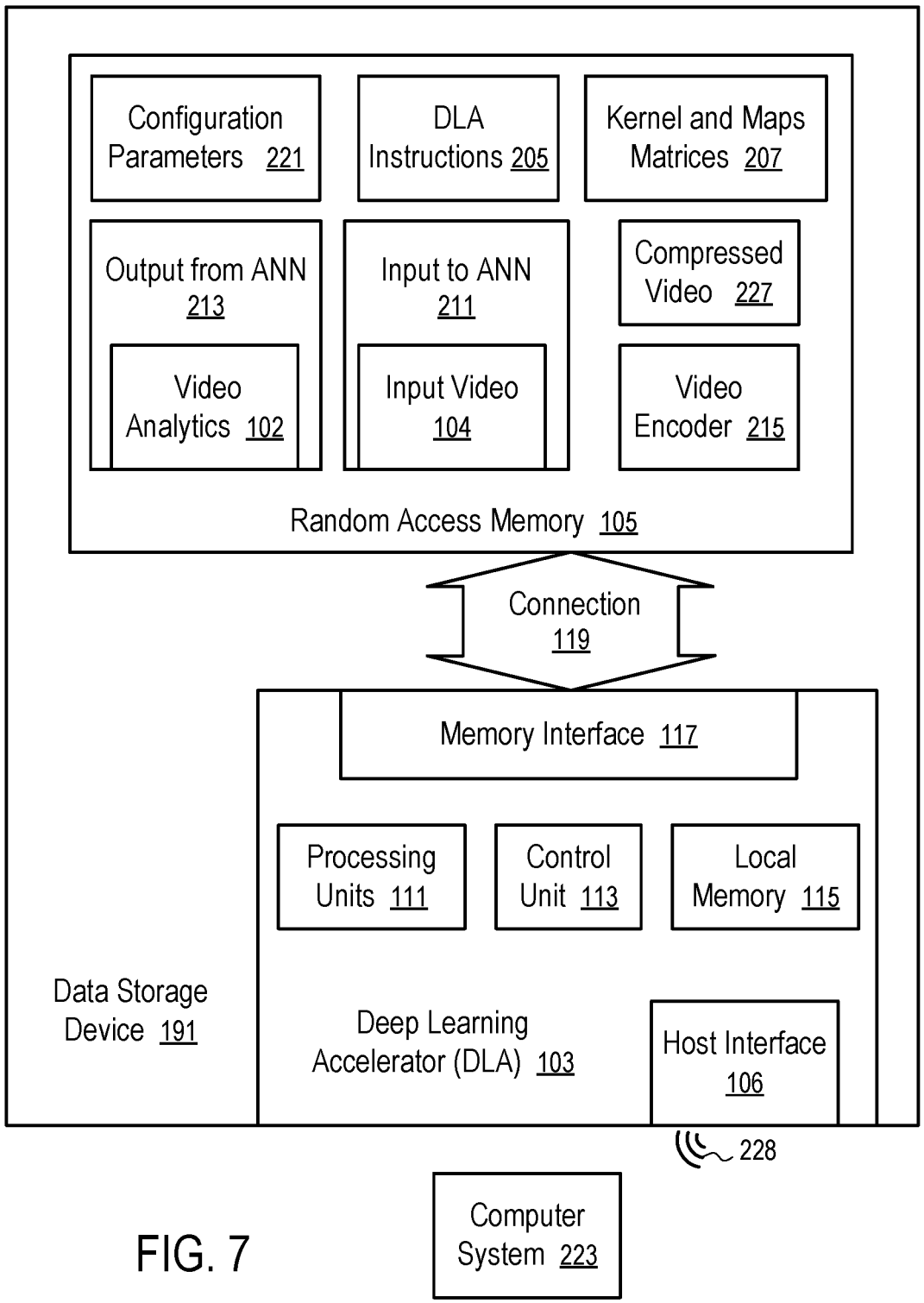
Figure 8:
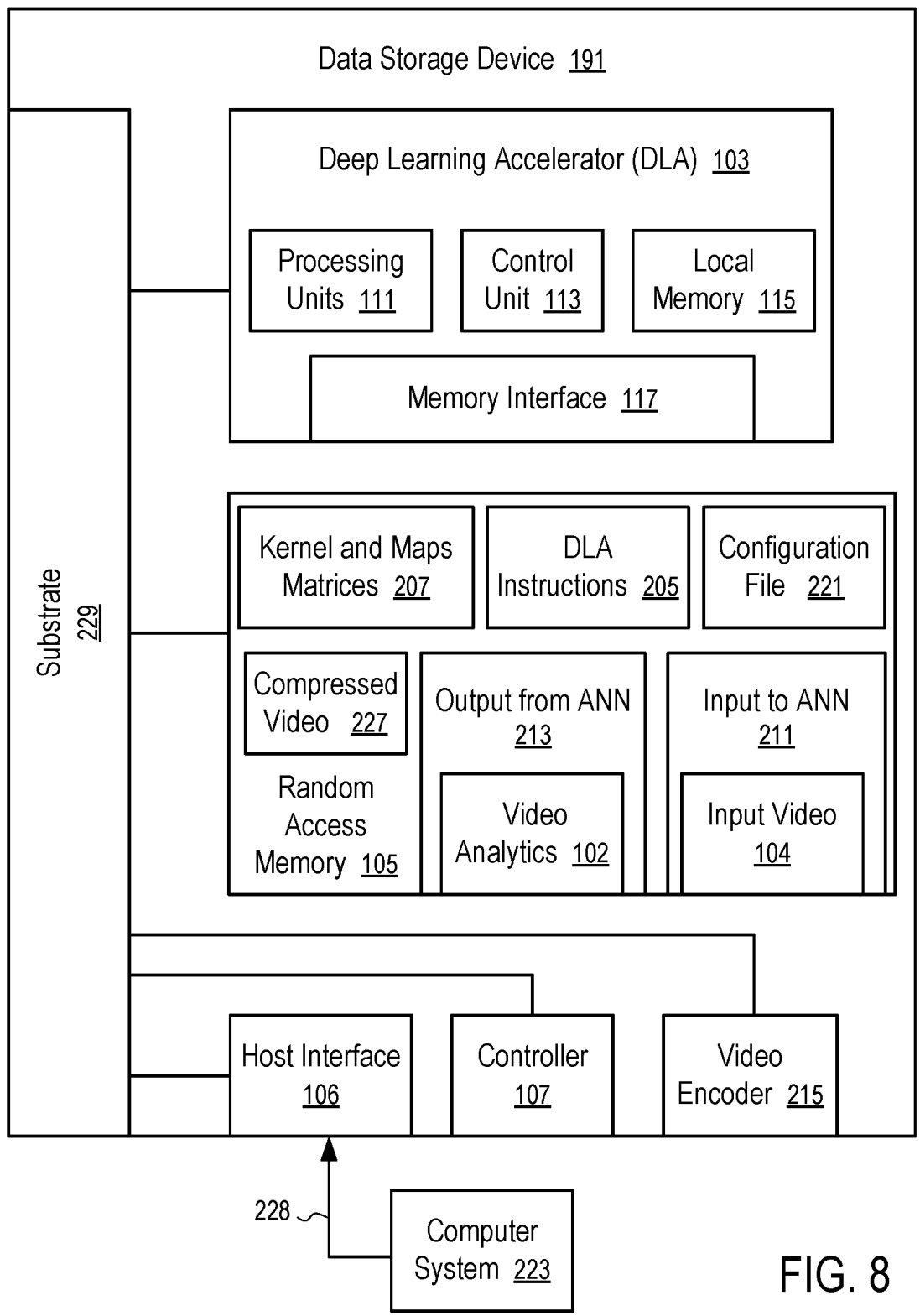

FIGS. 6-8 illustrate storage devices (191) having a Deep Learning Accelerator (103) and random access memory (105) configured according to some embodiments.

A data storage device (191) in FIG. 6, 7, or 8 includes a video encoder (215). The video encoder (215) can be implemented using software executed by a general purpose processor, or using an encoder logic circuit. In some embodiments, an encoding-specific logic circuit is used to accelerate a portion of the encoding operations; and a remaining portion of the encoding operations is performed by executing a set of software instructions. Thus, the video encoders (215) in FIG. 6, 7, or 8 are not limited to a specific hardware/software implementation.

The operations of the video encoder (215) are based at least in part on the video analytics (102) in the output (213) of the Artificial Neural Network (201) that receives the video (104) as input (211).

The input video (104) can be initially received from a computer system (223) in an uncompressed format, in a format compressed using a lossless compression technique, or in a format compressed using a lossy compression technique. Configuration parameters (221) are stored into the random access memory (105) to identify the format of the input video (104) and/or desired compression operations to be performed on the input video (104).

When the input video (104) is initially in a compressed format, the data storage device (191) uses a corresponding decoder to generate the video content in an uncompressed format where the image attributes of individual pixels in individual frames are explicitly specified. When a video is in a compressed format, at least some pixels of some frames in the video are implicitly specified using data associated with other pixels and/or other frames. The decoder can be implemented in the data storage device using hardware and/or software.

In some implementations, the decoder decompresses the input video (104) on the fly when the input video (104) is stored into the random access memory as the input (211) to the Artificial Neural Network (201), or when the input video (104) is retrieved from the random access memory as the input (211) to the Artificial Neural Network (201).

The Deep Learning Accelerator (103) executes the instructions (205) to generate the video analytics (102) of the input video (104). Depending on the deep learning-based coding technique used with video encoder (215), the video analytics (102) can include pixel probability model, intra-picture prediction, inter-picture prediction, cross-channel prediction, probability distribution prediction, transform, post-loop filtering, in-loop filtering, down-sampling, up-sampling, encoding optimization, etc.

Using the video analytics (102) and the input video (104), the video encoder (215) generates a compressed video (227). The data storage device (191) stores the compressed video (227) as a replacement of the input video (104).

In one embodiment, the input video (104) is a portion of a video stream. After the input video (104) is compressed and stored, another portion of the video stream can be stored into the random access memory (105) in the portion of the random access memory (105) that was previously occupied by the input video (104). Thus, it is not necessary to store the entire uncompressed version of the compressed video (227) in the random access memory (105) at the same time.

In some implementations, the data storage device (191) is configured to generate the compressed video (227) on the fly in real time with the streaming of video into the data storage device (191). For example, while the input video (104) is being analyzed to generate the video analytics (102), a subsequent portion of the video stream is stored into the random access memory (105) as the next input to the Artificial Neural Network (201). After the subsequent portion of the video stream is received in the data storage device (191), the video encoder (215) completes the generation of the compressed video (227) for the input video (104) using the video analytics (102). Thus, the Deep Learning Accelerator (103) can re-execute the instructions to analyze the subsequent portion of the video stream for the video encoder (215) to compress the subsequent portion, while a further portion is being received in the data storage device (191) and/or the random access memory (105).

In FIG. 6, an integrated circuit device (101) includes not only a Deep Learning Accelerator (103) and random access memory (105) but also a controller (107), and the logic circuit of a host interface (106) for a wired or wireless connection (228) to the computer system (223) that provides the input video (104). In some embodiments, the host interface includes a transceiver for wireless communications, such as a wireless personal area network transceiver (e.g., a Bluetooth transceiver) or a wireless local area network transceiver (e.g., a Wi-Fi transceiver).

For example, the controller (107), and the host interface (106) can be formed on an integrated circuit die that is stacked on and connected to the integrated circuit die(s) of the random access memory (105). Thus, the video data received in the host interface (106) can be stored by the controller (107) into the random access memory (105) as the input (211) to the Artificial Neural Network (201) implemented using the Deep Learning Accelerator (103).

The integrated circuit device (101) of FIG. 6 has a controller (107) that is configured to control the operations of the host interface (106), the video encoder (215), and/or the Deep Learning Accelerator (103).

The controller (107) can be implemented, for example, using a microcontroller or a sequencer that controls the timing of the operations of loading the input video (104) into the random access memory (105) and the generation of the compressed video (227) from the input video (104) and the video analytics (102).

Optionally, the controller (107) can be implemented using a microprocessor that runs an application stored in the random access memory (105) as firmware to coordinate the operations among the video encoder (215), the random access memory (105), the Deep Learning Accelerator (103), and/or a host interface (106).

After a set of frames of input video (104) is stored into the random access memory (105) as the input (211) to the Artificial Neural Network (201), the controller (107) can cause the Deep Learning Accelerator (103) to execute the instructions (205) and generate the video analytics (102) as the output (213) of the Artificial Neural Network (201).

For example, the controller (107) can instruct the Deep Learning Accelerator (103) to start the execution of the instructions (205) by writing the address of the input (211) at a predefined location in the random access memory (105). When the Deep Learning Accelerator (103) is in an idle state, the Deep Learning Accelerator (103) can periodically read the address stored at the predefined location in the random access memory (105). When a new and/or valid address is retrieved from the predefined location, the Deep Learning Accelerator (103) starts the execution of the instructions (205). Optionally, after starting the execution of the instructions (205), the Deep Learning Accelerator (103) can optionally clear, erase or invalidate the address previously stored at the predefined location in the random access memory (105).

Alternatively, the controller (107) is configured to send a signal or a message to the Deep Learning Accelerator (103) to instruct the Deep Learning Accelerator (103) to execute the instructions (205). The signal or a message can be transmitted from the controller (107) to the Deep Learning Accelerator (103) using a direct connection that does not go through the memory cells of the random access memory (105).

In some implementations, the controller (107) and the Deep Learning Accelerator (103) have separate connections (109 and 119) to the random access memory (105). When the controller (107) and the Deep Learning Accelerator (103) are not accessing a same block or address of the random access memory (105), the connections (109 and 119) can be used by the controller (107) and the Deep Learning Accelerator (103) in parallel to access different portions of the random access memory (105) simultaneously.

In other implementations, the control unit (113) and the controller (107) can share at least a portion of their circuitry in the Deep Learning Accelerator (103) and use the same memory interface (117) to access the random access memory (105).

A portion of the processing units (111) can be implemented using neuromorphic memory (225). For example, the neuromorphic memory (225) can include a crossbar array of memristors configured to perform Multiply-and-Accumulate (MAC) operations via analog circuitry. For example, a multiply-accumulate units (e.g., 171 or 173) in a vector-vector unit (e.g., 161) of the Deep Learning Accelerator (103) can be implemented using a crossbar array of memristors. The memristors can be connected in an array with wordlines and bitlines configured to address the memristors as memory cells. A typical memristor is connected to one of the wordlines and one of the bitlines in the array.

Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations. The current in the bitline can be compared with a threshold to determine whether a neuron represented by the bitline is activated under the current input. An array of memristors can be connected to the bitlines respectively and programmed to have thresholds corresponding to the activation level thresholds of the neurons. A current detector can be configured for each memristor connected to the output of a bitline to determine whether the level of electric current in the bitline corresponding to a level that exceeds the threshold of the memristor. The neuromorphic memory (225) can perform the Multiply-and-Accumulate (MAC) operations in a way similar to a memory device reading an array of memory cells and thus with low energy cost and high computation speed.

Through a connection (108) the controller (107) operates the host interface (106) of the integrated circuit device (101) of FIG. 6 to communicate with a separate computer system (223) through a wired connection (228). Alternatively, or in combination, the data storage device (191) includes a transceiver for a wireless connection (228).

For example, the host interface (106) can be configured to communicate according to a communication protocol for a memory card interface, a Universal Serial Bus (USB), a Peripheral Component Interconnect (PCI) bus, a PCI express (PCIe) bus, a local area network, a peripheral bus, a Mobile Industry Processor Interface (MIPI), a wireless personal area network or a wireless local area network, or a communication protocol of Internet of Things (IoTs). For example, the host interface (106) can be formed on a Radio Frequency (RF) CMOS (Complementary Metal Oxide Semiconductor) integrated circuit chip.

For example, the data storage device (191) can use the host interface (106) to receive the input video (104) from the computer system (223) for compression using the Artificial Neural Network (201).

The host interface (106) can be used by the data storage device (191) to receive data and/or instructions from the computer system (223), such as the configuration parameters (221), the matrices (207) and the instructions (205) of the Artificial Neural Network (201). The host interface (106) can be used by the data storage device (191) to provide the compressed video (227) to the computer system (223), or another device.

Optionally, the computer system (223) can request the data storage device (191) to stream the compressed video (227) to the computer system (223) or another device for playback. Optionally, the controller (107) can decompress the compressed video (227) and stream the video in a resolution and/or format identified in the configuration parameters (221).

In some implementations, the control unit (113) of the Deep Learning Accelerator (103) can include the controller (107); and the logic circuit of the host interface (106) can be implemented on the integrated circuit die of the Deep Learning Accelerator (103), as illustrated in FIG. 7.

In FIG. 7, the Deep Learning Accelerator (103) is configured on an integrated circuit die; and the random access memory (105) is configured on one or more integrated circuit dies. The control unit (113) controls not only the execution of the instructions (205) of the Artificial Neural Network (201), but also the communications of the host interface (106) with the computer system (223) and the operations of the video encoder (215).

For example, the control unit (113) controls the host interface (106) to receive a video stream from the computer system (223) and stores the input video (104) into the random access memory (105) through the high bandwidth connection (119).

In some implementations, a portion of the video encoder (215) is implemented using logic circuit that is enclosed in an integrated circuit package of an integrated circuit device (101) (e.g., as illustrated in FIG. 6).

Alternatively, the logic circuit of the video encoder (215) can be a separate component (e.g., an integrated circuit chip) that is outside of an integrated circuit package that encloses the Deep Learning Accelerator (103) and the random access memory (105).

For example, an integrated circuit chip of the video encoder (215), and an integrated circuit device (101) having the Deep Learning Accelerator (103) and the random access memory (105) can be mounted on a printed circuit board configured in the data storage device (191).

The data storage device (191) of FIG. 8 has a substrate (229) that provides connections among its components, such as a Deep Learning Accelerator (103), random access memory (105), a video encoder (215), a controller (107), and a host interface (106).

In some implementations, the substrate (229) includes an integrated circuit die having wires for connecting the components. Some of the components (e.g., the integrated circuit die(s) of the random access memory (105), the Deep Learning Accelerator (103), the controller (107), the video encoder (215), and/or the host interface (106)) can be connected to the integrated circuit die of the substrate (229) via Through Silicon Vias (TSVs). Other components can be connected to the substrate (229) via wire bonding, die attach, or another technique.

In some implementations, the substrate (229) further includes a printed circuit board having wires for connecting the components and other components, such as a power source (e.g., battery), a display, a light-emitting diode (LED) indicator, etc.

In some implementations, the circuits of the host interface (106), the controller (107), the video encoder (215) are integrated in a same integrated circuit chip; and the input of the integrated circuit chip includes a video stream from the computer system (223) to the random access memory (105). In other implementations, the host interface (106) is separate from the integrated circuit chip of the controller (107) and/or the video encoder (215).

In some implementations, the logic circuit of the host interface (106) and/or the controller (107) are configured on the integrated circuit die of the Deep Learning Accelerator (103), or another integrated circuit die.

Figure 9:
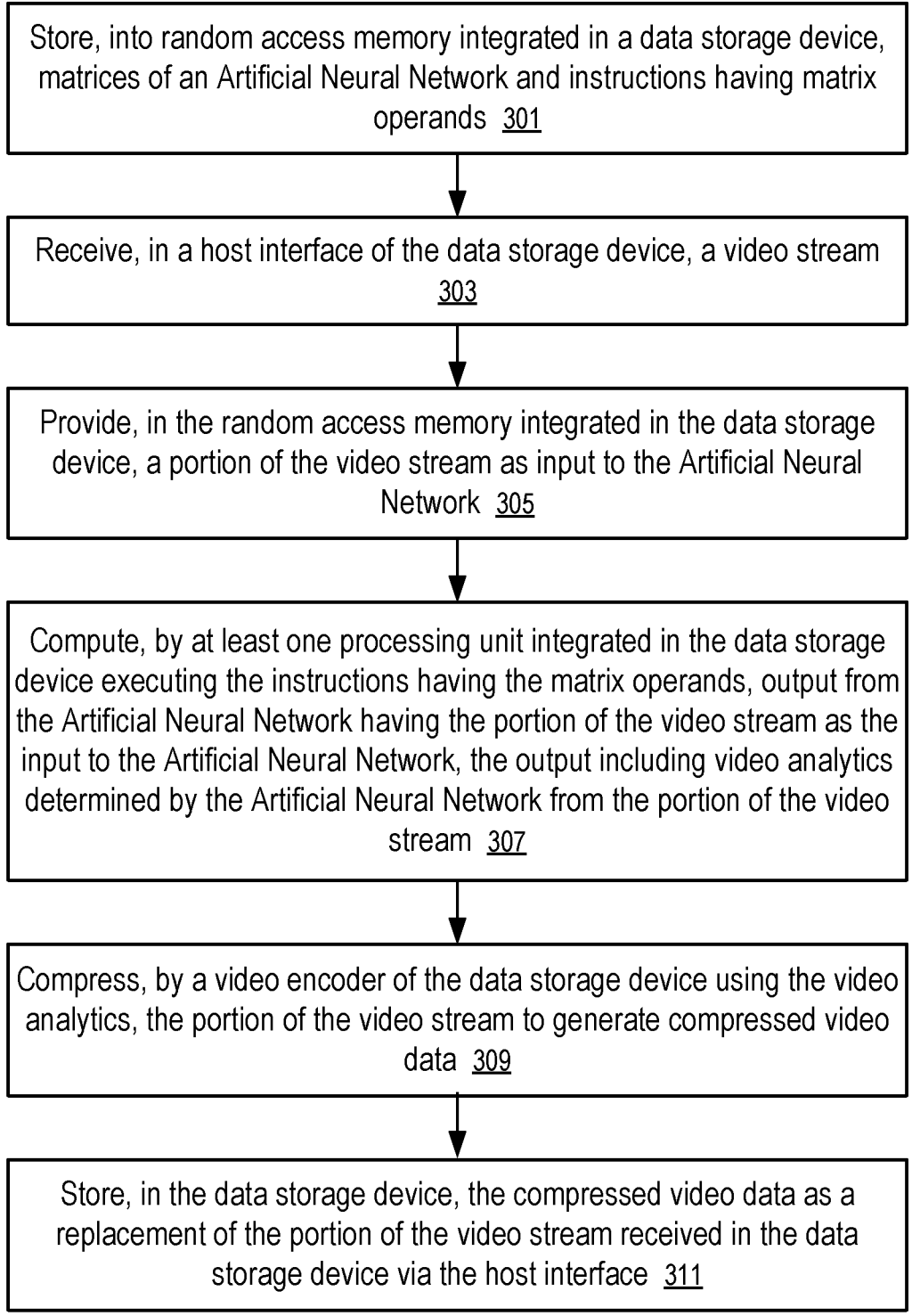
FIG. 9 shows a method implemented in a storage device according to one embodiment.

FIG. 9 shows a method implemented in a data storage device (191) according to one embodiment. For example, the method of FIG. 9 can be implemented in the data storage device (191) of FIG. 6, FIG. 7, or FIG. 8.

At block 301, matrices (207) of an Artificial Neural Network (201) and instructions (205) having matrix operands are stored into random access memory (105) integrated in a data storage device (191).

For example, the data storage device (191) can be a removable storage media of a computer system (223).

For example, the removable storage media can be a memory card, a Universal Serial Bus (USB) drive, a solid state drive (SSD), a network storage device, etc.

For example, the removable storage media can be a plug and play device that is connectable to a computer system (223) for normal operation and dis-connectable from the computer system (223) without restarting the computer system (223).

For example, the computer system (223) can be a digital camera, a personal computer, a mobile computer, a smartphone, a personal media player, a set top box, a hub of Internet of Things (IoTs), or a server computer.

At block 303, a host interface (106) of the data storage device (191) receives a video stream.

For example, the host interface (106) can be configured to communicate with the computer system (223) in accordance with a protocol of a memory card interface, a Universal Serial Bus (USB), a Peripheral Component Interconnect (PCI) bus, a PCI express (PCIe) bus, a peripheral bus, a local area network, a Mobile Industry Processor Interface (MIPI), a wireless personal area network, a wireless local area network, or Internet of Things (IoTs).

At block 305, the data storage device (191) provides, in the random access memory (105) integrated in the data storage device (191), a portion of the video stream (e.g., 104) as input (211) to the Artificial Neural Network (201).

At block 307, the data storage device (191) computes, by at least one processing unit (111) integrated in the data storage device (191) executing the instructions (205) having the matrix operands, output (213) from the Artificial Neural Network (201) that has the portion of the video stream (e.g., 104) as the input (211). The output (213) of the Artificial Neural Network (201) includes video analytics (102) determined by the Artificial Neural Network (201) from the portion of the video stream (e.g., 104) as the input (211).

For example, the video analytics can include a pixel probability model, an intra-picture prediction, an inter-picture prediction, a cross-channel prediction, or a probability distribution prediction, or any combination thereof.

For example, the video analytics can include parameters and/or options based on which a video encoder is configured to perform transform, post-loop filtering, in-loop filtering, down-sampling, up-sampling, or encoding optimization, or any combination thereof.

For example, the at least one processing unit (111) can be formed on an integrated circuit die of a Field-Programmable Gate Array (FPGA) or Application Specific Integrated circuit (ASIC) implementing a Deep Learning Accelerator (103). The Deep Learning Accelerator (103) can include the at least one processing unit (111) for matrix instruction execution, local memory (115) to buffer matrix operands and results, a control unit (113) that can load the instructions (205) from random access memory (105) for execution, and a memory interface (117) to access the random access memory (105).

For example, an integrated circuit package configured to enclose at least the integrated circuit die of FPGA or ASIC and one or more integrated circuit dies of the random access memory. In some implementations, the integrated circuit package further encloses the controller and/or the host interface (106).

For example, the random access memory (105) and the Deep Learning Accelerator (103) are formed on separate integrated circuit dies and connected by Through-Silicon Vias (TSVs).

At block 309, a video encoder (215) of the data storage device (191) compresses, using the video analytics (102), the portion of the video stream (e.g., 104) to generate compressed video data (227).

At block 311, the data storage device (191) stores the compressed video data (227) as a replacement of the portion of the video stream (e.g., 104) that is initially received in the data storage device (191) via the host interface (106).

The generation of the video analytics (102) from the input video (104) and the compression of the input video (104) using the video analytics (102) can be performed in real time during the streaming of the video from the computer system (223) to the data storage device (101).

For example, the video analytics (102) is generated for the portion of the video stream (e.g., input video (104)) and used to compress the portion (104) during a time period in which a further portion of the video stream is received in the host interface (106). Thus, the compression of the video stream is performed on the fly during the streaming of the video stream from the computer system (223) to the host interface (106).

For example, while a first portion of the video stream is being analyzed using the Artificial Neural Network (201) to generate the video analytics (102) that is then used to compress the first portion, a second portion of the video stream is received in the host interface (106) from the computer system (223) and buffered into the random access memory (105). The compression of the first portion is completed during the streaming of the second portion. After the second portion is buffered in the random access memory (105), the Deep Learning Accelerator (103) executes the instructions (205) again to generate the video analytics (102) of the second portion, while a third portion is received in the host interface (106) from the computer system (223). Since the first portion has been stored as the compressed video, the storage capacity in the random access memory (105) previously used to store/buffer the first portion can be freed to store/buffer the third portion.

Optionally, the host interface (106) can be used to receive a set of configuration parameters (221) from the computer system (223) (e.g., using one or more write commands). The set of configuration parameters can be used to identify parameters for the conversion of a video stream received at the host interface (106) into compressed video (e.g., 227) stored in the data storage device (191), such as a video resolution, a video format, and/or a location of storing a compressed version of the video stream (e.g., 227) in the data storage device (191). After the set of configuration parameters (221) is stored into a predetermined location in the random access memory (105) of the data storage device (191), The compression of an input video stream arriving at the host interface (106) can be performed autonomously by the data storage device (191) according to the set of configuration parameters without help from the computer system (223).

The present disclosure includes methods and apparatuses which perform the methods described above, including data processing systems which perform these methods, and computer readable media containing instructions which when executed on data processing systems cause the systems to perform these methods.

A typical data processing system may include an interconnect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A single-chip device, Application Specific Integrated Circuit (ASIC), comprising:

a removable storage media configured within a single integrated circuit package and configured for being removably connected to a computer system, wherein when connected to the computer system, the device is dis-connectable from the computer system without restarting the computer system;

wherein the removable storage media comprises a host interface, a random access memory, a controller, at least one processing unit, and a video encoder, wherein:

the host interface is connectable to the computer system to receive a video stream;

the random access memory is configured to store first data representing weights of an artificial neural network and store second data representing instructions having matrix operands, the instructions executable to implement matrix computations of the artificial neural network using the first data representing the weights of the artificial neural network;

the controller is coupled with the random access memory and the host interface, wherein the controller is configured to:

load, in response to the computer system writing to the host interface third data representative of a portion of the video stream into the random access memory, the instructions for execution within the device; and apply autonomously the third data as an input to the artificial neural network in the execution of the instructions to implement computations of the artificial neural network;

the at least one processing unit is coupled with the random access memory and configured to execute the instructions, loaded by the controller responsive to the portion of the video stream being written by the computer system to the host interface, wherein the execution of the instructions is configured to generate video analytics as an output of the artificial neural network, and wherein the controller is configured to control the execution of the instructions using the at least one processing unit in generating the output and store the output in the random access memory; and the video encoder is coupled to the random access memory and configured to compress the portion of the video stream using the video analytics generated as the output of the artificial neural network, wherein the video encoder is configured to compress the portion of the video stream based on a set of configuration parameters and the video analytics, the video analytics including at least one of:

data representative of a pixel probability model; and intra-picture prediction, inter-picture prediction, cross-channel prediction, or probability distribution prediction, or any combination thereof; and wherein the controller is configured to write fourth data representative of a compressed version of the portion of the video stream in the device as a replacement of the portion of the video stream received via the host interface to reduce storage space usages of the portion of the video stream written by the computer system into the host interface.

2. The device of claim 1, wherein the video encoder is configured to perform, based on the video analytics, transform, post-loop filtering, in-loop filtering, down-sampling, up-sampling, or encoding optimization, or any combination thereof.

3. The device of claim 2, wherein the computer system is a digital camera, a personal computer, a mobile computer, a smartphone, a set top box, a personal media player, a hub of Internet of Things (IoTs), or a server computer.

4. The device of claim 2, wherein the host interface is configured to communicate in accordance with a protocol of a memory card interface, a Universal Serial Bus (USB), a Peripheral Component Interconnect (PCI) bus, a PCI express (PCIe) bus, a peripheral bus, a local area network, a Mobile Industry Processor Interface (MIPI), a wireless personal area network, a wireless local area network, or Internet of Things (IoTs).

5. The device of claim 2, wherein the video analytics is generated for the portion of the video stream and used to compress the portion during a time period in which a further portion of the video stream is received in the host interface.

6. The device of claim 5, wherein compression of the video stream is performed on the fly during streaming of the video stream from the computer system to the host interface.

7. The device of claim 6, wherein the host interface is further configured to receive the set of configuration parameters from the computer system; the set of configuration parameters identifies a video resolution, a video format, or a location of storing a compressed version of the video stream in the device; and the compression of the video stream is performed autonomously by the device according to the set of configuration parameters.

8. The device of claim 5, further comprising:

an integrated circuit die of a Field-Programmable Gate Array (FPGA) or Application Specific Integrated circuit (ASIC) implementing a Deep Learning Accelerator, the Deep Learning Accelerator comprising the at least one processing unit, and a control unit configured to load the instructions from the random access memory for execution.

9. The device of claim 8, wherein the at least one processing unit includes a matrix-matrix unit configured to operate on two matrix operands of an instruction;

wherein the matrix-matrix unit includes a plurality of matrix-vector units configured to operate in parallel;

wherein each of the plurality of matrix-vector units includes a plurality of vector-vector units configured to operate in parallel;

wherein each of the plurality of vector-vector units includes a plurality of multiply-accumulate units configured to operate in parallel; and wherein each of the plurality of multiply-accumulate units includes neuromorphic memory configured to perform multiply-accumulate operations via analog circuitry.

10. The device of claim 9, wherein the random access memory and the Deep Learning Accelerator are formed on separate integrated circuit dies and connected by Through-Silicon Vias (TSVs); and the device further comprises:

an integrated circuit package configured to enclose at least the random access memory and the Deep Learning Accelerator.

11. A method, comprising:

storing, into a random access memory of a data storage device configured as a removable storage media, first data representative of weights of an artificial neural network and second data representative of instructions having matrix operands, the removable storage media comprising a host interface, the random access memory, a controller, at least one processing unit, and a video encoder, wherein the removable storage media when connected to a computer system is dis-connectable from the computer system without restarting the computer system;

receiving, via the host interface of the data storage device, a video stream; and in response to third data representative of a portion of the video stream being written by the computer system to the host interface:

loading, by the controller, the instructions for execution within the data storage device to implement matrix computations of the artificial neural network using the first data representative of the weights;

apply, by the controller autonomously, the third data representative of the portion of the video stream as an input to the artificial neural network in the execution of the instructions to implement computations of the artificial neural network;

computing, by the controller using the at least one processing unit of the data storage device executing the instructions represented by the second data stored in the random access memory, an output from the artificial neural network responsive to the input applied according to the third data, the output including video analytics determined by the artificial neural network from the portion of the video stream;

compressing, by the video encoder of the data storage device using the video analytics, the portion of the video stream to generate compressed video data; and storing, in the data storage device, the compressed video data as a replacement of the portion of the video stream to reduce storage space usages of the portion of the video stream written by the computer system to the host interface of the data storage device.

12. The method of claim 11, wherein the video analytics identifies a pixel probability model, an intra-picture prediction, an inter-picture prediction, a cross-channel prediction, a probability distribution prediction, a transform, a post-loop filtering option, an in-loop filtering option, a down-sampling option, an up-sampling option, or an encoding optimization option, or any combination thereof.

13. The method of claim 12, wherein the portion is a first portion of the video stream; the video stream includes the first portion and a second portion; and the compressing is performed during a time period the second portion is streamed to the data storage device.

14. The method of claim 13, further comprising:

receiving, in the host interface of the data storage device, a set of configuration parameters; and writing, into the random access memory of the data storage device, the set of configuration parameters;

wherein the compressed video data is generated by the data storage device as the replacement of the portion of the video stream according to the set of configuration parameters in response to the portion being stored into the data storage device via the host interface.

15. An apparatus, comprising:

a removable storage media comprising a host interface, a random access memory, a field-programmable gate array (FPGA) or application specific integrated circuit (ASIC), and a video encoder;

wherein when connected to a computer system, the apparatus is dis-connectable from the computer system without restarting the computer system, wherein:

the random access memory is configured to store matrices of an artificial neural network and store instructions having matrix operands, the instructions executable in the FPGA or ASIC to implement computations of the artificial neural network using the matrices;

the host interface is coupled with the random access memory and configured to receive a video stream to store a portion of the video stream into the memory as an input to the artificial neural network;

the FPGA or ASIC comprises:

a memory interface to access the random access memory; and at least one processing unit configured to execute the instructions;

wherein in response to the computer system writing the portion of the video stream to the host interface of the removable storage media:

the removable storage media is configured to load the instructions for execution in the FPGA or ASIC and apply autonomously the portion of the video stream as an input to the artificial neural network to generate, using the matrices stored in the random access memory, an output of the artificial neural network responsive to the portion of the video stream as the input, the output including video analytics of the portion of the video stream;

the video encoder is configured to compress the portion of the video stream using the video analytics to generate compressed video data; and the apparatus is configured to store the compressed video data as a replacement of the portion of the video stream to reduce storage space usages of the portion of the video stream written to the host interface by the computer system.

16. The apparatus of claim 15, wherein the video analytics includes a pixel probability model, an intra-picture prediction, an inter-picture prediction, a cross-channel prediction, a probability distribution prediction, a transform, a post-loop filtering option, an in-loop filtering option, a down-sampling option, an up-sampling option, or an encoding optimization option, or any combination thereof.

\* \* \* \* \*